United States Patent [19]
Bocabeille et al.

[11] Patent Number: 5,783,241
[45] Date of Patent: Jul. 21, 1998

[54] METHOD FOR PRODUCING CYLINDRICAL GEL FOOD PRODUCTS

[75] Inventors: Gilles Bocabeille; Patrice Gaudet, both of Vannes, France

[73] Assignee: Soreal S.A., Malansac, France

[21] Appl. No.: 514,068

[22] Filed: Aug. 11, 1995

[30] Foreign Application Priority Data

Aug. 17, 1994 [FR] France .................... 94 10191

[51] Int. Cl.$^6$ ........................................ A23L 1/00
[52] U.S. Cl. .................... 426/276; 426/516; 426/573
[58] Field of Search ...................... 426/573, 512, 426/516, 276, 577; 425/71, 93

[56] References Cited

U.S. PATENT DOCUMENTS

| | | | |
|---|---|---|---|
| 3,922,360 | 11/1975 | Sneath | 426/276 |
| 4,362,748 | 12/1982 | Cox | 426/276 |
| 4,927,574 | 5/1990 | Herrington | 425/71 |
| 5,393,546 | 2/1995 | Thota et al. | 426/276 |

OTHER PUBLICATIONS

Database WPI, Week 8528, Derwent, Patent Abstracts of Japan of JP-A-60 099 336 (Mitsubishi Acetate), vol. 009, No. 421, 27 Sep. 1985.

*Primary Examiner*—George Yeung
*Attorney, Agent, or Firm*—Roland Plottel

[57] ABSTRACT

A method for producing food products made from a basic alginate or pectin gel by means of gelatinization extrusion. A cylinder is extruded from an extrusion die with a predetermined section. The cylinder has a basic mixture, including a natural food ground product such as a fruit or vegetable, a gelatinizing agent: e.g. alginate or pectin and water. The cylinder is extruded directly from the extrusion outlet die into a vertically elongated receiving bath that contains free calcium ions which ensure the immediate gel setting of an outer wall of the extruded cylinder. The bath has a density such that the extruded cylinder remains free from any stress which might cause the cylinder to warp before the cylinder has sufficiently hardened.

10 Claims, 2 Drawing Sheets

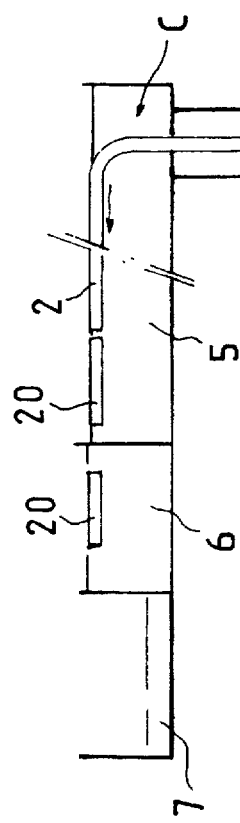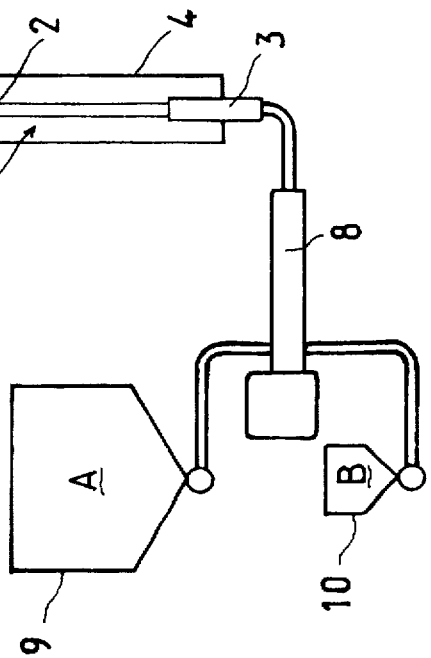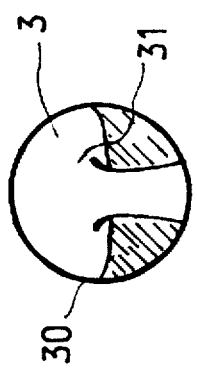

METHOD FOR PRODUCING CYLINDRICAL GEL FOOD PRODUCTS

BACKGROUND OF THE INVENTION

1. Field of the Invention

The present invention concerns food products and basically in particular fruit and vegetables restored in the form of a gel.

2. Description of the Related Art

The method for producing these products is well-known and makes use of a retexturing technique based on the thickening properties of alginate and pectin in the presence of a calcium salt.

The patent FR-A-2 114 706 in the name of Unilever NV discloses a method by which an alginate or lower methoxypectate soil mixed with a derivative substance of the natural product, such as the pulp, is gelatinized with the aid of calcium ions. The various compounds are first of all mixed with a complexing agent of the calcium which is able to delay gelatinization until the moment when the mixture is transferred into moulds. The shape of the moulds are selected according to the destination of the products: rectangular to obtain plates, narrow and elongated to obtain small sticks which shall be divided into slices and quarters, etc. This patent also indicates that an appropriate shaping variant for imitating cherries may consist of extruding the mixture, including the soil, the calcium ions and the material derived from fruit in the form of drops in a bath containing calcium ions which rapidly form a gelatinized skin on the artificial cherries.

For a long time, these restored products have only been used in a limited way and incorporated in desserts or milk products, such as yoghurts. But for several years, their sphere of use has clearly been extended with the development of ready to cook culinary preparations, such as skewers and cooked dishes.

As regards these new products, the presentation is important as the organoleptic qualities, which has caused the current applicant to implement a method for producing a skin effect on restored fruit and vegetables so as to make them even more similar to natural products, said method being described in the patent application FR-A-2 696 325.

As regards the shape given to the products obtained by retexturing gelatinization, up until now basically two techniques have been used. In the first technique, the gelatinizing mixture is placed on a rug and after a sufficient rest time, the gel obtained is cut with a hollow punch type tool. This way of carrying out the technique has clear drawbacks in causing significant losses of raw material and does not make it possible to produce complex shapes.

As mentioned in said patent in the name of Unilever LV, the second technique consists of filling moulds with the gelatinizing mixture and carrying out removal from the mould after the gel setting. If this second technique allows for the embodiment of more and complex elaborate shapes than with the first technique, it however totally lacks flexibility and cannot be automated in acceptable conditions which renders it less adaptable for industrial exploitation.

SUMMARY OF THE INVENTION

The object of the present invention is to improve the presentation of products obtained by retexturing gelatinization concerning shapes which may be too complex in order to be obtained by currently used techniques.

At the same time, another important sought-after goal has been to provide the retextured products with complex shapes by means of a method able to be implemented simply and effectively in industrial conditions.

To this effect, the invention consists of an extrusion/gelatinization method by which a continuous cylinder with a predetermined section is embodied by extruding a basic mixture including a grinding extract of a natural food product, such as a fruit or vegetable, and a gelatinizing agent, namely alginate or pectin and water, said continuous cylinder being received directly at the outlet of the extrusion die in a receiving bath containing free calcium ions which ensure the gelatinization of the outer wall of the cylinder, said bath being selected with a density so that the cylinder is brought to it free from any stress likely to warp it before it has sufficiently hardened.

The bath at the extrusion die outlet shall preferably comprise a solution acidified with a chloride or calcium lactate which shall provide gelatinization on the surface of the cylinder as soon as it has formed at the outlet of the extrusion die.

The shape of the final sought-after product shall be given by the section of the die, namely the section of the continuously extruded cylinder which at the end of processing shall be divided into segments; sections or slices reproducing the same sections or slices of the natural product. To ensure that this reproduction is conducted properly, it is shall be appropriate that the section given to the cylinder by the die is preserved as best as possible after the extrusion phase. Now, it is quite clear that if gelatinization on the surface of the cylinder may be almost instantaneous, the same does not apply to complete gelatinization which shall occur progressively during transit in the calcic receiving bath of the cylinder at the die outlet. Accordingly, so as to prevent it from warping, it is essential to prevent it from undergoing any external stress, including gravity, since otherwise it would weaken under the effect of its own weight. This is why an important characteristic of the invention consists of ensuring that the cylinder is fully supported in the calcic bath at the die outlet. The density of the bath could be finely adjusted by adding to it suitable tasty solutes, such as lactose, sodium chloride, etc.

In one preferred embodiment of the method of the invention, the extruded cylinder is directed vertically at the die outlet in the calcic bath and it vertically transits it for a given period according to the height of the bath and the extrusion speed during which full thickening takes place. The density of the bath is preferably selected as being higher than that of the cylinder so that the latter naturally rises towards the surface under the effect of buoyancy. The density difference shall then be adjusted so that the rise of the cylinder in the bath occurs flat but not excessively so as to avoid any warping by expansion. It is to be noted that if action is taken on the density of the calcic bath by adding adequate solutes, it is possible to also lighten the cylinder by bringing about a certain volume swell in the alginate-pulp-water mixture prior to extrusion by incorporating fats and/or swelling or emulsifying agents to embody a microemulsion.

In addition, the calcic bath at the die outlet may be coloured by adding a conventional colouring agent. Thus, a coloured skin shall appear on the surface of the extruded cylinder so as to improve resemblance of the final product with the natural product.

Other gelitanizing agents, such as carraghenates (Irish moss extraction) whose viscosity depends on the temperature, may be incorporated in the basic mixture in addition to the alginate or pectin gelitanizing agents. The calcic receiving bath at the extrusion die outlet shall quickly harden inside the extruded cylinder, this hardening being able to even start in the extrusion die if the latter is cooled. To this effect, it could consist of a tubular-shaped element with a constant section and having the largest portion of its length being located inside said calcic bath.

The invention is able to embody full sectional cylinders with a relatively complex profile reproducing, for example, the shape of a mushroom slice. In this case, the distance between the centre of the cylinder and its peripheral surface shall generally be too large for the internal gelatinization of the alginate or pectin being provided by the calcium ions of the calcic bath at the die outlet. According to the invention, so as to ensure the internal gelatinization of the product, calcium ions are then dispersed in the mixture prior to passage in the extrusion die. To this effect, a mixer is provided upstream of the extrusion die and receiving in appropriate proportions the jellifying mixture, the pulp and the solution containing calcium ions. So as to delay start of the reaction, it is advisable to provide a complexing calcium agent incorporated in the formulation.

The invention is also able to embody hollow cylinder to be used to reproduce stone fruit sections, such as olives. In this case, a tubular cylinder is extruded by a ring-shaped die orifice. According to the invention, by using a central orifice of the extrusion die, during extrusion a central current of a solution is created containing free calcium ions. The flow needs to be accurately adjusted so that the solution exactly fills the internal volume of the cylinder which is formed at the die outlet, any gap being likely to engender a warping via crushing or swelling depending on whether it is negative or positive respectively. The solution is preferably of the same type as that of the cylinder receiving bath, namely a chloride or calcium acidified solution which shall provide the almost instantaneous formation of an internal sheath of the extruded tube at the same time as a given outer sheath forming in the calcic bath at the die outlet. If the distance between the two sheaths is reduced, as in the case where an olive is used, the internal gelatinization of the alginate or pectin could be provided by calcium ions migrating towards the inside of the product from is inner and outer surfaces. Like the receiving bath at the die outlet, the solution injected into the extruded tubular cylinder may contain a suitable colouring agent so as to make appear a coloured skin on the inner surface of the product.

Of course, via extrapolation on the basis of the method defined above, it is possible to embody tubular cylinders having several internal channels so as to reproduce fruit sections with multiple cells, such as tomatoes. The die used to achieve this end shall then comprise several solution outlets acidified with chloride or calcium lactate which shall have a suitable shape and spaced from one another inside the extrusion die of the product.

By means of coextrusion of two different basic mixtures, the invention also makes it possible to embody a composite cylinder comprising, for example, a peripheral portion around a central portion for reproducing stuffed products.

In the calcic bath at the die outlet and after it has been adjusted to horizontal if it should happen to arrive on the surface, the extruded cylinder is cut into sections which shall be subjected to additional treatments once these sections have sufficiently hardened. The sections shall first of all be transferred into a rinsing bath and then be subsequently colored on the surface by implementing the coloring technique described in said patent application FR-A-2 696 325 in the name of the applicant. The sections are then cut so as to form the final product in sections or slices which are then ready to be packed.

The invention also concerns a device to implement the method described above, said device being characterised in that it includes extrusion means and a container for containing a bath for receiving the extruded product, the outlet of the extrusion die being located inside said container.

According to another characteristic of this device, the extrusion die is orientated vertically at the bottom of said container which has a vertically elongated shape.

BRIEF DESCRIPTION OF THE DRAWINGS

Other advantages and characteristics of the invention shall appear more readily from a reading of the following description with reference to the accompanying drawings on which:

FIG. 1 is a diagrammatic view illustrating the implementation of the method of the invention for embodying a mushroom-based retextured product in the form of a slice, FIG. 2 is a diagrammatic view relating to a coloring stage of the method shown on FIG. 1, FIG. 3 is a front view of the outlet of an extrusion die able to be used when implementing said method.

DESCRIPTION OF THE PREFERRED EMBODIMENTS

Example 1

Mushroom slice

Figure 4:
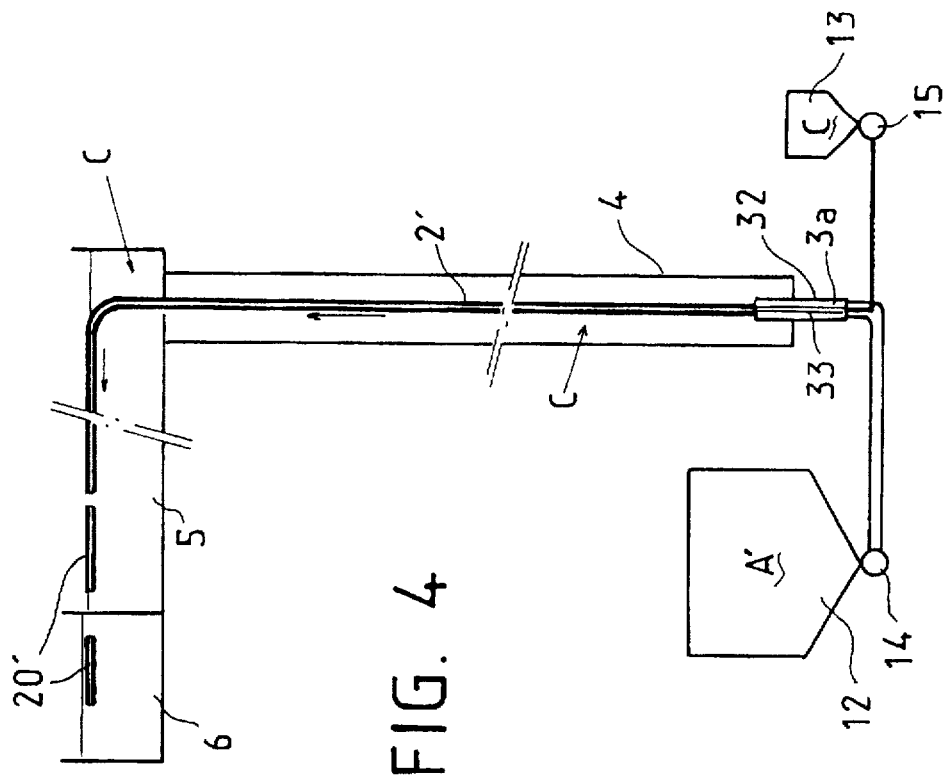
FIG. 4 is a diagrammatic view similar to FIG. 1 and illustrating the implementation of the method of the invention for embodying an olive-based extruded product in the form of a slice.

In order to implement the production method, the device shown on FIG. 1 is used.

This device includes extrusion means mainly including a die 3 having the shape of an elongated tube 30 with a passage channel 31, FIG. 3, whose internal right-hand section is constant as far as its outlet and has the shape of a mushroom slice.

The die 3 is mounted vertically at the bottom of a container 4 so that its outlet and most of its length are located inside the container 4 has a vertically elongated shape, its height in practice being at least one meter, indeed clearly larger so as to be able to increase the extrusion speed accordingly. The wall of the container 4 is preferably at least partly transparent so as to allow for a visual internal inspection.

The upper portion of the container 4 communicates with a horizontally elongated container 5 with which other tanks 6, 7 are aligned, the other containers being a rinsing container and a coloring container. The device is ended by cutting and conditioning means (not shown).

The die 3 is located downstream of a mixer 8 fed from vats 9, 10 via channels and pumps equipped with flow meters.

The production method is carried out as follows:

Firstly, the containers 4 to 7 have been filled with treatment baths, namely a solution acidified with calcium lactate C for the containers 4 and 5, a rinsing bath for the container 6 and a coloring bath for the container 7. In the containers 4 and 5, the calcic bath C is preferably an aqueous solution including about 5% calcium lactate, about 1% citric acid and about between 1 and 3% of salt and/or lactose. It is kept at a low temperature of, say, about between 2° and 5° C. In addition, during implementation of the method, the bath C shall of course be regularly reloaded with calcium.

In the containers 9 and 10, a basic mixture A and a mixture B are produced with the following constituents whose percentages are indicated with respect to the weight of the final product

| Mixture A | |
| --- | --- |
| Mushroom pulp | 40 to 50% |
| Sodium alginate | 1 to 2% |
| Carraghenate | 0.5 to 1% |
| Sodium pyrophosphate | 0.1 to 0.3% |
| Oil | |
| Salt | |
| Water | added to 95% |
| Mixture B | |
| Calcium sulphates | 1 to 2% |
| Xanthane | 0.02 to 0.04% |
| Water | added to 5% |

The mixtures A and B are introduced into the mixer 8 and respectively in the proportions of 95% and 5%. By virtue of the presence of sodium pyrophosphate shall slow down the freeing of the calcium ions, the gelatinization of the alginate shall not start before the mixture AB has entered the die 3 where it shall already be cooled owing to the fact that the latter is partially immersed in the bath C at the low temperature of the container 4. This cooling shall be expressed by a reduction of the viscosity of the mixture before the mixture leaves the outlet of the die 3, especially owing to the presence of the carraghenate.

At the outlet of the die 3, the extruded cylinder 2 which penetrates into the calcic bath C shall be immediately found sheathed outwardly owing to the instantaneous action of the free calcium ions on the alginate at the periphery. In addition, because its density is lower than that of the bath C, the cylinder is naturally going to rise to vertical and be slightly stretched towards the surface in the container 5. At the end of this vertical movement, it shall reach a certain degree of hardening due to cooling by the bath C and especially on account of full gelatinization of the alginate by the calcium ions derived from B. It could therefore withstand bending without being badly warped which could occur when lying down horizontally when it reaches the surface of the bath in the container 5.

The cylinder 2 shall continue to move horizontally into the container 5 and driven, for example, by a current created on the surface of the bath until it has sufficiently hardened straight through before being cut into sections 20 inside the bath C where they are subsequently left for a further period of time. The sections 20 are then transferred into the rinsing container 6 and then to a coloring station where the under portion of each side of the foot is browned to this effect, the sections 20 are driven, as shown on FIG. 2, onto two parallel conveyors 11 between which the foot 20a is inserted, said conveyors being endless strips coated with felt whose lower end soaks up the coloring agent in the container 7. Coloring is effected in accordance with the technique described in said patent application FR-A-2 696 325 in the name of the present applicant. Once the colouring stage has ended, the sections 20 are divided into slices which are then packed.

The same device and same technique may be used to embody products of any shape, for example fancy shapes (star, lozenge, clover, heart, etc) from a neutral base which shall replace the mushroom pulp in Mixture A. This neutral base may be prepared with lactose and water.

Example 2

Olive slice

In order to implement the production method, the device shown on FIG. 4 is used.

In common with the device of FIG. 1, this device has all the containers 4, 5 and 6 which accordingly bear the same references on FIG. 4 and shall not be described again here in detail. As for the die 3a, it has the same elongated shape as the die 3 and is similarly mounted at the bottom of the container 4.

Figure 5:
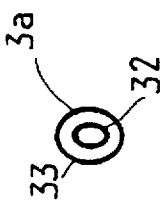
FIG. 5 is a diagrammatic front view of the outlet of an extrusion die able to be used to implement the method shown on FIG. 4, and FIGS. 6 and 7 are views similar to FIG. 5 and relating to two dies corresponding to two other shapes of perforated products, such as an apricot or peach and an avocado pear.

The die 3a diagrammatically shown opposite FIG. 5 includes an external tube 32 whose section, corresponds in shape and size to an olive slice, and also includes an internal central tube 33 whose section corresponds in shape and size to the kernel hole in said slice. The outer tube 32 and inner tube 33 are fed from two containers 12 and 13 respectively via channels and pumps with flow meters 14 and 15 respectively.

The production method takes place as follows:

Firstly, the containers 4 to 6 have been filled with treatment baths, namely a solution acidified with calcium lactate C for the containers 4 and 5, a rinsing bath for the container 6. In the containers 4 and 5, the calcic bath C is preferably, as in the preceding example, an aqueous solution including about 5% calcium lactate, about 1% citric acid and about between 1 and 3% of salt (sodium chloride) and/or lactose. It is kept at a low temperature of, say, about between 2° and 5° C. In addition, a colouring agent may be added to the bath C which shall make appear a coloured skin on the outer surface of the extruded product.

The vat 13 contains a given calcic bath C, whereas a basic mixture A' is embodied in the vat 12 with the following constituents whose percentages are indicated with respect to the weight of the final product:

| Mixture A' | |
| --- | --- |
| Olive pulp | 40 to 50% |
| alginate | 1 to 2% |
| Carraghenate | 0.5 to 1% |
| Oil | 2 to 5% |
| Water | added to 100% |

The mixture A' is pushed into the tube 32 of the die 3a by the pump 14 and at the same time a current of a calcic solution C pumped from the vat 13 flows through the internal tube 33. At the die outlet, a tubular cylinder 2' is thus created having a section identical to that of the tube 32 with a central channel having a section identical to that of the tube 33 filled with a calcic solution C. Immediately at the outlet of the die 3a, an accompanying internal sheath shall be formed and an outer sheath owing to the immediate action of the calcium ions on the alginate present on the inner and outer surfaces of the cylinder 2'. Of course, it would be appropriate to accurately adjust the flows of the mixture A' and the solution C so that their extrusion speeds are equal.

Full gelatinization of the alginate in the cylinder 2' shall not occur in this instance via the action of the calcium ions derived from the calcic solutions C which shall migrate towards the inside from the inner and outer surfaces of the product. As in the preceding example, this gelatinization shall be effected progressively during the time the cylinder 2' moves into the containers 4 and 5.

For the remainder, the production method occurs exactly in the same as in the preceding example as regards the baths 4, 5 and 6, the stage for cutting the slices 20' into sections and in the packaging stage.

Figure 6:
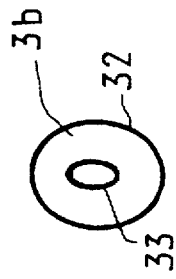
Figure 7:
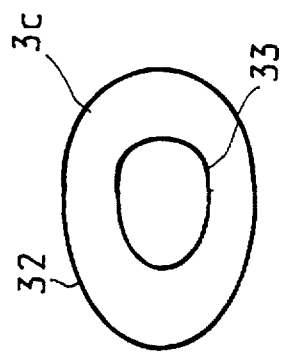

FIGS. 6 and 7 are diagrammatic views illustrating the profile of the dies 3b and 3c being of the same type as the die 3a but whose sections of the external 32 and internal 33 tubes correspond to a peach or apricot slice shape and an avocado slice shape in the second case where the distance between the periphery of the central hole and the circumference of the slice is relatively large, it may be necessary to ensure that full gelatinization of the tubular cylinder by the calcium ions is embodied as in example 1. The same applies for the production of a cylinder stuffed by coextrusion.

The advantages of the invention are multiple, including:
the possibility of making full use the entire basic product, the fruit and vegetables, including waste;
the suppression in the case of kernel fruit of any operations impeding removal of seeds and cutting;
the uniformity of the products obtained with significant possibilities concerning shape definition.

We claim:

1. A method for producing a cylindrical food product having a basic alginate or pectin gel by means of gelatinization extrusion, comprising the steps of:

mixing a natural ground food product selected from the group consisting of fruit and vegetable, a gelatinizing agent selected from the group consisting of alginate and pectin, and water to form a gel mixture;

extruding the gel mixture in the form of a continuous cylindrical gel food product into a vertically elongated receiving bath having a predetermined temperature and containing sufficient amount of free calcium ions to immediately set the gel on the outer surface of said cylindrical gel food product, the receiving bath having a density such that the cylindrical gel food product remains free from any stress which would cause warping of the cylindrical gel food product before the cylindrical gel food product has sufficiently hardened;

conveying the continuous cylindrical gel food product through the elongated receiving bath; and removing the continuous cylindrical gel food product from the receiving bath.

2. The method of claim 1 further comprising the step of dividing said continuous cylindrical gel food product into sections or slices.

3. The method according to claim 1, wherein the extruded cylindrical gel food product is directed vertically from a die outlet into the receiving bath and vertically transits during a period according to the height of the bath and the extrusion speed.

4. The method according to claim 3, wherein the density of said receiving bath is greater than that of the cylindrical gel food product so that said cylindrical gel food product naturally rises towards the surface of said bath.

5. The method according to claim 1, wherein the receiving bath contains a coloring agent for externally coloring the extruded cylindrical gel food product.

6. The method according to claim 1, where said gelatinizing agent has a viscosity which varies with temperature, and the receiving bath has a temperature in a range of approximately 2 to 5 C.

7. The method according to any one of claims 1, 3 or 4, wherein said cylindrical gel food product has a solid section and said gel mixture comprises calcium ions dispersed in said gel mixture prior to said extrusion, whereby internal gelatinization of the alginate or pectin is brought about.

8. The method according to claim 7, wherein the calcium ions are dispersed in the gel mixture in the presence of a calcium complexing agent.

9. The method according to any one of claims 1, 3 or 4 wherein the cylindrical gel food product is in the shape of a hollow cylinder, and wherein the gel mixture is extruded by an annular orifice of a die, and further comprising the step of applying a solution containing free calcium ions on an internal wall of said hollow cylinder, thereby forming an internal sheath on the inside of said hollow cylinder wall while at the same time an outer sheath forms on an external surface of the cylinder in the receiving bath.

10. The method according to any one of claims 1, 3 or 4 wherein another mixture including a ground food product, gelatinizing agent and water, different from said gel mixtures is coextruded with said gel mixture so as to form a stuffed cylindrical gel food product.

* * * * *